US011501762B2

(12) United States Patent
Tran et al.

(10) Patent No.: US 11,501,762 B2
(45) Date of Patent: Nov. 15, 2022

(54) COMPOUNDING CORRECTIVE ACTIONS AND LEARNING IN MIXED MODE DICTATION

(71) Applicant: Microsoft Technology Licensing, LLC, Redmond, WA (US)

(72) Inventors: Emily Tran, Seattle, WA (US); Robert L. Chambers, Sammamish, WA (US); Erez Kikin-Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 16/942,718

(22) Filed: Jul. 29, 2020

(65) Prior Publication Data
US 2022/0036883 A1     Feb. 3, 2022

(51) Int. Cl.
| G06F 40/166 | (2020.01) |
| G10L 15/16 | (2006.01) |
| G10L 15/065 | (2013.01) |
| G10L 15/18 | (2013.01) |
| G10L 15/22 | (2006.01) |

(52) U.S. Cl.
CPC .......... *G10L 15/16* (2013.01); *G10L 15/065* (2013.01); *G10L 15/18* (2013.01); *G10L 15/22* (2013.01)

(58) Field of Classification Search
None
See application file for complete search history.

(56) References Cited

U.S. PATENT DOCUMENTS

| 5,991,594 | A | * | 11/1999 | Froeber | G09B 5/065 |
| | | | | | 434/317 |
| 6,839,669 | B1 | * | 1/2005 | Gould | G10L 15/22 |
| | | | | | 704/246 |
| 9,922,642 | B2 | * | 3/2018 | Pitschel | G10L 15/063 |
| 10,810,274 | B2 | * | 10/2020 | Thomson | H04N 21/4826 |
| 11,150,730 | B1 | * | 10/2021 | Anderson | G02B 27/0172 |
| 2002/0138265 | A1 | * | 9/2002 | Stevens | G10L 15/22 |
| | | | | | 704/E15.04 |

(Continued)

OTHER PUBLICATIONS

"International Search Report and Written Opinion Issued in PCT Application No. PCT/US21/030748", dated Sep. 7, 2021, 11 Pages.

*Primary Examiner* — Jakieda R Jackson
(74) *Attorney, Agent, or Firm* — NovoTechIP International PLLC

(57) ABSTRACT

Techniques performed by a data processing system for processing voice content received from a user herein include receiving a first audio input from the user comprising a mixed-mode dictation, analyzing, using one or more machine learning (ML) models, the first audio input to obtain a first interpretation of the mixed-mode dictation, presenting the first interpretation to the user in an application on the data processing system, receiving a second audio input from the user comprising a corrective command, analyzing the second audio input to obtain a second interpretation of the restatement of the mixed-mode dictation presenting the second interpretation to the user, receiving an indication from the user that the second interpretation is a correct interpretation of the mixed-mode dictation, and modifying the operating parameters of the one or more machine learning models to interpret the subsequent instances of the mixed-mode dictation based on the second interpretation.

8 Claims, 12 Drawing Sheets

(56) References Cited

U.S. PATENT DOCUMENTS

| | | | |
|---|---|---|---|
| 2003/0139925 A1* | 7/2003 | Anderson | G10L 15/065 |
| | | | 704/231 |
| 2004/0098263 A1* | 5/2004 | Hwang | G10L 15/18 |
| | | | 704/266 |
| 2004/0138881 A1* | 7/2004 | Divay | G10L 15/22 |
| | | | 704/E15.025 |
| 2007/0033025 A1* | 2/2007 | Helbing | G10L 15/08 |
| | | | 704/231 |
| 2008/0091406 A1* | 4/2008 | Baldwin | G06F 3/167 |
| | | | 704/4 |
| 2013/0024195 A1 | 1/2013 | White et al. | |
| 2014/0142937 A1* | 5/2014 | Powledge | G06F 3/017 |
| | | | 704/235 |
| 2014/0164476 A1* | 6/2014 | Thomson | G06Q 10/101 |
| | | | 709/203 |
| 2015/0149163 A1 | 5/2015 | Vanblon et al. | |
| 2016/0378747 A1* | 12/2016 | Orr | G10L 15/26 |
| | | | 704/9 |
| 2017/0186427 A1* | 6/2017 | Wang | G10L 15/19 |
| 2017/0263248 A1* | 9/2017 | Gruber | G06F 40/166 |
| 2018/0068657 A1* | 3/2018 | Khan | G10L 15/063 |
| 2018/0190264 A1* | 7/2018 | Mixter | G10L 15/22 |
| 2019/0266237 A1 | 8/2019 | Ray et al. | |
| 2019/0340241 A1* | 11/2019 | Ganesan | G06K 9/6267 |
| 2020/0020319 A1* | 1/2020 | Malhotra | G10L 15/063 |

* cited by examiner

Command Processing for Forced Command in Mixed-Mode Dictation

Example Command 1: "Type <phrase to be typed as text>"

Example Utterance 1: "Type question mark"

Correct Interpretation: "question mark"

Incorrect Interpretation: "?"

Example Command 2: Punctuation <phrase to be typed as punctuation mark>"

Example Utterance 2: "Punctuation question mark"

Correct Interpretation: "?"

Incorrect Interpretation: "question mark"

FIG. 3

Command Processing for Forced Command in Mixed-Mode Dictation

Example Command: "Command <phrase to be processed as command>"

Example Utterance 1: "The quick brown fox jumped over the lazy dog"

Correct Interpretation: "The quick brown fox jumped over the lazy dog"

Example Utterance 2: "Command bold that"

Correct Interpretation: "The quick brown fox jumped over the lazy dog"

Incorrect Interpretation: "The quick brown fox jumped over the lazy dog command bold that"

FIG. 4

Corrective Command Processing in Mixed-Mode Dictation

505 — Example Corrective Command: "No <phrase to try again>"

510 — Example Utterance 1: "The quick brown fox jumped over the lazy dog"

515 — Correct Interpretation: "The quick brown fox jumped over the lazy dog"

520 — Example Utterance 2: "Command bold that"

525 — Incorrect Interpretation: "The quick brown fox jumped over the lazy dog Command bold that"

530 — Corrective Command: "No, bold the last sentence"

535 — Correct Interpretation: "The quick brown fox jumped over the lazy dog."

FIG. 5

Sequential Command Processing in Mixed-Mode Dictation

605 — Example Command: "Also <subsequent command>"

610 — Example Utterance: "The quick brown fox jumped over the lazy dog."

615 — Correct Interpretation: "The quick brown fox jumped over the lazy dog."

620 — Example Command 1: "Command bold that"

625 — Correct Interpretation: "The quick brown fox jumped over the lazy dog."

630 — Example Command 2: "Also, underline that"

635 — Correct Interpretation: "<u>The quick brown fox jumped over the lazy dog.</u>"

FIG. 6

COMPOUNDING CORRECTIVE ACTIONS AND LEARNING IN MIXED MODE DICTATION

BACKGROUND

Voice input for computing devices provides user with a means for dictating textual content and/or entering commands to control operations of the computing device. Current voice inputs solutions often have difficulties determining whether a voice input includes textual content, voice commands, or both. The user experience is diminished when, for example, commands are mistakenly interpreted as textual input, or textual input is mistaken for a command, causing the computing device to perform an undesired operation. Thus, there are significant areas for new and approved mechanisms for voice-based content manipulation.

SUMMARY

An example data processing system according to the disclosure includes a processor and a computer-readable medium storing executable instructions. The executable instructions cause the processor to perform operations of receiving a first audio input from a user comprising a mixed-mode dictation, wherein the mixed-mode dictation includes a command to be executed by an application on the data processing system, textual content to be rendered by the application, or both; analyzing the first audio input to obtain a first interpretation of the mixed-mode dictation by processing the first audio input using one or more natural language processing models to obtain a first textual representation of the mixed-mode dictation and processing the first textual representation using one or more machine learning models to obtain the first interpretation of the mixed-mode dictation; presenting the first interpretation of the mixed-mode dictation to the user in an application on the data processing system; receiving a second audio input from the user comprising a corrective command in response to presenting the first interpretation in the application, wherein the second audio input includes a restatement of the mixed-mode dictation with an alternative phrasing; analyzing the second audio input to obtain a second interpretation of the restatement of the mixed-mode dictation provided by the user by processing the second audio input using one or more natural language processing models to obtain a second textual representation of the restatement of the mixed-mode dictation and processing the second textual representation using one or more machine learning models to obtain the second interpretation of the mixed-mode dictation; presenting the second interpretation to the user in the application on the data processing system; receiving an indication from the user that the second interpretation is a correct interpretation of the mixed-mode dictation; and responsive to the indication from the user, modifying the operating parameters of the one or more machine learning models to interpret the subsequent instances of the mixed-mode dictation based on the second interpretation by generating training data for the one or more machine learning models that associates the mixed-mode dictation with the second interpretation and retraining the one or more machine learning models using the training data.

Another example data processing system according to the disclosure includes a processor and a computer-readable medium storing executable instructions. The executable instructions cause the processor to perform operations of receiving a first audio input comprising spoken content that includes a first command; analyzing the first audio input using one or more machine learning models to obtain a first interpretation of the first audio input including first context information; processing the first interpretation of the first audio input in an application based on the first context information; receiving, subsequent to the first audio input, a second audio input comprising spoken content that includes a second command; analyzing the second audio input using the one or more machine learning models to obtain a second interpretation of the second audio input including second context information, wherein the second interpretation is based at least in part on the first context information associated with the first command; and processing the second interpretation in the application based on the second context information.

Another example data processing system according to the disclosure includes a processor and a computer-readable medium storing executable instructions. The executable instructions cause the processor to perform operations of receiving a first audio input from a user comprising a spoken content; identifying a forced-action command and command information included in the spoken content, wherein the forced-action command indicates that a particular action is to be performed based on the command information; analyzing the second audio input using the one or more machine learning models to obtain a second interpretation of the second audio input, the second interpretation including second context information, wherein the second interpretation is based at least in part on the first context information associated with the first command; and processing the first interpretation of the first audio input in an application based on the first context information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is an example showing processing of a forced command in mixed mode dictation.

FIG. 4 is another example showing processing of a forced command in mixed-mode dictation.

FIG. 5 is an example showing processing of a corrective command in mixed-mode dictation.

FIG. 6 is an example showing processing of sequential commands in mixed-mode dictation.

DETAILED DESCRIPTION

Figure 1A:
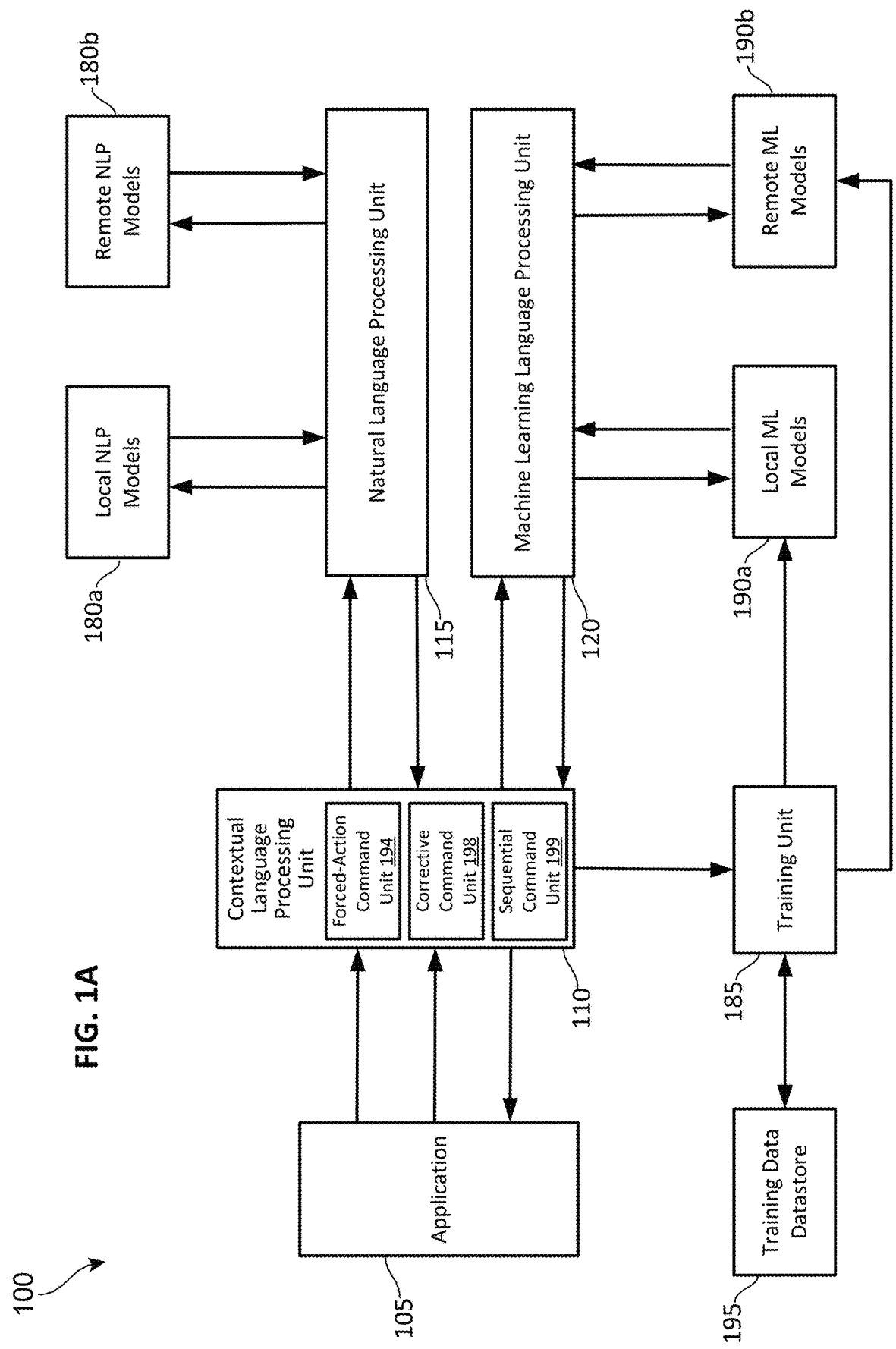
FIG. 1A is a block diagram illustrating an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for improved voice-based content manipulation are provided herein that use context to enable improved interpretation of voice inputs including mixed-mode inputs in which textual dictation and commands may be dictated without an express signal that a switch between text dictation and command dictation has occurred. The techniques disclosed herein provide a technical solution to the technical problem of improving the interpretation of voice inputs by machine learning models by compounding corrective actions and learning. The user may provide immediate voice feedback and the machine learning models may be updated based on this feedback to improve future performance.

The dictated content may include textual content to be processed by an application, one or more commands to be executed by the application, or a combination thereof. The techniques disclosed herein may perform a multistage analysis of an audio input in which the dictated content is first processed by one or more natural language processing models to analyze audio inputs received from the user and translate these audio inputs into textual outputs. The natural language processing models are trained to accurately recognize the words spoken in the audio input and to translate those words into textual output that represents what was said by the user. The textual output of the natural language processing models may then be analyzed by one or more machine learning models to determine a context of what was said by the user. The one or more machine learning models may output context information that may provide an indication whether the textual output includes a textual content, a command, or a combination thereof. The context information of the textual output provides an indication of whether the textual output includes the command and an indication of how the user intended to apply the command to content in an application utilizing these techniques. Additional context information may be obtained from the application that may be used to disambiguate the meaning of what was said by the user. The additional context information may include cursor or insertion point (IP) location information and/or other information that indicates how the user was interacting with the application prior to, during, or after issuing a voice command.

The techniques disclosed herein also provide a technical benefit of improving the machine learning models through corrective feedback. The machine learning models may occasionally incorrectly infer the context of an utterance by a user. The techniques disclosed herein provide the user with the ability to provide immediate feedback regarding the accuracy of the inference made by the machine learning models. For example, the machine learning models may infer that an utterance was a command when the user intended that the utterance be textual input, or vice versa. Another technical benefit of the techniques disclosed herein is that the user may provide corrective feedback through voice inputs without significantly interrupting the user experience.

Figure 1B:
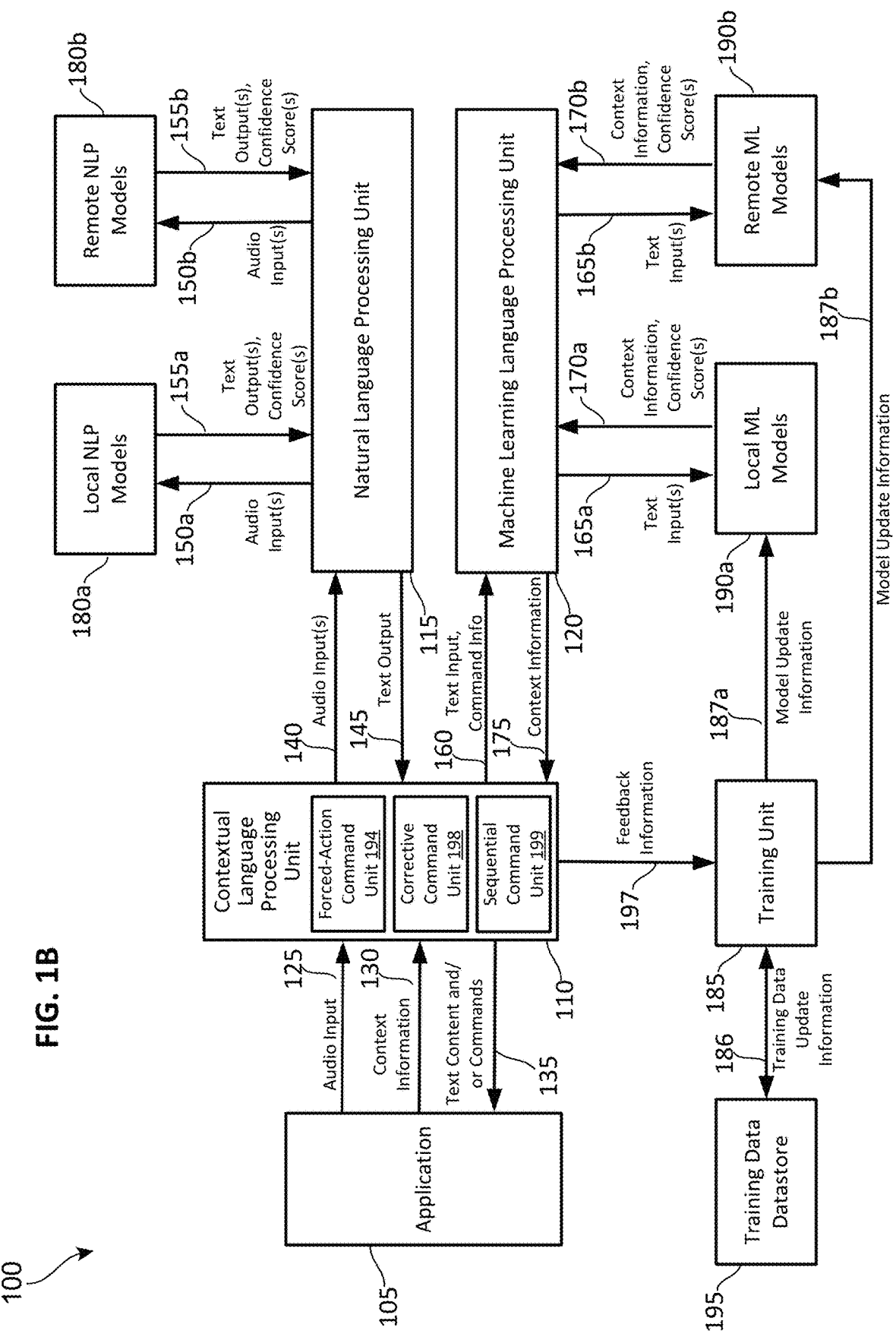
FIG. 1B is a block diagram illustrating additional details of the example computing environment illustrated in FIG. 1A.

FIG. 1A is a block diagram illustrating an example computing environment 100 in which the techniques disclosed herein may be implemented, and FIG. 1B is another block diagram of the example computing environment which illustrates example data which may be exchanged between the various components illustrated in the computing environment 100. The computing environment 100 includes an application 105, a contextual language processing unit (CLPU) 110, a natural language processing unit (NLPU) 115, a machine learning language processing unit (MLLPU) 120, one or more local natural language processing (NLP) models 180*a*, one or more remote NLP models 180*b*, one or more local machine learning (ML) models 190*a*, and one or more remote ML models 190*b*. The machine learning models may be implemented using various types of models, including but not limited to Recurrent Neural Networks (RNNs), Feed Forward Networks (FFNs), Convolutional Neural Networks (CNNs), and Transformer Neural Networks (TNNs).

The computing environment 100 may also include a training unit 185 and a training data store 195. The CLPU 110 may include a forced-action command unit 194, corrective command unit 198, and a sequential command unit 199. In some implementations, the functionality of the one or more of the NLPU 115, the MLLPU 120, the one or more local NLP models 180*a*, and the one or more NLP models 180*b* may be implemented by the CLPU 110. Furthermore, in yet other implementations, at least a portion of the functionality of the CLPU 110 may be implemented by the application 105.

The application 105 may be configured to receive textual input and/or commands through voice input. The application 105 may be a word processing application, an email application, a spreadsheet application, a messaging application, a presentation application, or other type of application that may be configured to receive voice inputs that may include textual input, commands, or both.

The application 105 may be implemented on various types of computing devices, such as but not limited to a personal computer (PC), a tablet computer, a laptop computer, a netbook, a gaming and/or entertainment system, a smart phone, a mobile device, or a wearable device. The application 105 may be implemented as executable program code implemented on the computing device or may be implemented as a cloud-based application that may be implemented at least in part on one or more remote servers, such as the cloud-based applications 235 of FIG. 2, and may be accessed through a web-browser or other such interface on a computing device, such as the user device 205 of FIG. 2. The user device 205 may access the cloud-based applications 235 via the network 215. The network 215 may be one or more public and/or private networks and may be implemented at least in part by the Internet.

The CLPU 110 may utilize the natural language processing unit 115 to provide speech recognition services for converting spoken language content included in an audio sample to text. The CLPU 110 may utilize the MLLPU 120 to determine a context for the text and to disambiguate the meaning of the text. The CLPU 110 is configured to obtain an audio input captured by a microphone or microphones associated with the computing device on which the application 105 is being executed and to process that audio input to identify content included in the audio input. The content may include textual input to be processed by the application 105, commands to be executed by the application 105, and/or both. The textual input may, for example, be textual content being dictated by the user for inclusion in a document being edited using the application 105. The commands may be related to editing and/or formatting textual input. For example, the user may state "bold the previous word" or "underline that" to render a word of the textual content in a bold font or to underline the word. Other types of formatting commands may be presented by the user in a voice command. The specific types of formatting commands recognized and supported by the application 105 depend upon the capabilities of the application 105 may be vary from application to application. The content may also include may be related to controlling the operation of one or more features of the application 105. For example, the user may state "save and close document" or "open new document" to save a document currently being worked on by the user and to open a new document, respectively. These examples are intended to illustrate how a user may utilize voice inputs to provide textual content and/or commands to an application 105 but do not limit the techniques disclosed herein to these specific examples. Additional use cases are illustrated in the examples that follow.

The NLPU 115 may be configured to use one or more speech models for converting an audio signal received by the application 105 into textual content representing the spoken content included in the audio signal. In the context of this application, the audio input being "received by the application" refers to an audio input being captured by one or more microphones associated with the computing device on which the application 105 is being executed. The audio signals may be provided as input to the application 105, which may in turn provide all or a portion of the audio input to the CLPU 110.

The NLPU 115 may process the audio content with more than model and compare the outputs of the models to determine the text to output by NLPU 115. The NLPU 115 may be configured to include one or more local NLP models 180a that are implemented locally on the computing device on which the application 105 is being executed, one or more remote NLP models 180b provided by a remote server, or both. The one or more remote NLP models 180b may be implemented on one or more remote servers that are accessible via a network connection. In some implementations, the audio input that includes spoken content may be streamed from the user's computing device to a cloud-based service for speech recognition, such as the speech processing cloud services 225 illustrated in FIG. 2 and described in detail in the examples that follow. Text output and/or other information from the cloud-based service may be transmitted back to the computing device via the network connection. The one or more local NLP models 180a may be built into the application 105 and/or an operating system of the computing device on which the application 105 is being executed. In some implementations, a user may configure the NLPU 115 to utilize one or more custom NLP models provided by a user of the computing device.

Each NLP model may associate a confidence score with the textual output generated by the model. The NLPU 115 may select an output from among the outputs generated by the models used by the NLPU 115 as the text output of the NLPU 115. This approach allows the CLPU 110 to decouple speech recognition from natural language understanding. The CLPU 110 can use various speech recognition engines to convert speech to text, and the resulting textual output may be provided to the MLLPU 120 for natural language understanding.

The MLLPU 120 is configured to receive the text output by the NLPU 115 and other contextual information associated with the application 105 to determine a contextual meaning for the text output by the NLPU 115. The natural language processing techniques employed by the NLPU 115 may provide extremely accurate speech to text services, but without an understanding of the contextual meaning of the text the application 105 may incorrectly interpret the textual output of the NLPU 115. For example, the textual output of the NLPU 115 may include textual content for the application 105, commands to be executed by the application 105, or a combination thereof. Without a contextual understanding of the textual output of the NLPU 115, textual content may be incorrectly interpreted as a command or vice versa. Furthermore, even if a command is recognized as a command, the intent of the user with regard to the command may be unclear. Suppose, for example, that the user recites the sentence "machine learning is interesting" followed by the command "bold that." The intent of the user is not clear based on the text alone. The user may intend to have the entire sentence rendered in bold font or the last word "interesting" rendered in bold font. Alternatively, the phrase "bold that" may not have been a command at all but instead may be the start of a new sentence of textual content. The NLPU 115 does not need to understand the underlying meaning or context of the text, the NLPU 115 just needs to provide an accurate transcription of the spoken input into text that may be analyzed by the MLLPU 120 for context.

The MLLPU 120 is configured to analyze the text generated by the NLPU 115 using one or more machine learning models, such as the one or more local ML models 190a and one or more remote ML models 190b, to provide a contextual understand of how the words are being used in the text output by the NLPU 115. The examples that follow illustrate the how the MLLPU 120 may be used to provide contextual understanding of the textual content, including interpretation of ambiguous command language included therein.

The MLLPU 120 may be configured to provide a context-sensitive understanding of commands included in the textual input. Suppose the user utters the phrase "bold that" as a command. What the word "that" refers to is ambiguous without additional context. The word "that" may be referring to rendering a last word or last phrase entered as bold or may be referring to a selected section of textual content. The MLLPU 120 may process the text and contextual information provided by the application 105 to determine a meaning for "that" as used in the command. The contextual information provided by the application 105 may include information indicative of how the user was interacting with the application 105 when the command "bold that" was spoken. The contextual information may include an indication that user has selected a section of text content in the application. The MLLPU 120 may determine that the selected content was intended to be rendered in bold text in this context. The contextual information may also include a position of a cursor or insertion point (IP) in the document being edited at the time that the command was spoken. The context information may include an indication of the type of application being used by the user, and what type of content was being edited by the user at the time that the command was spoken. For example, if the IP indicates was positioned in a header of the document at the time that the phrase "bold that" was spoken, the MLLPU 120 may interpret this command to indicate that the entire header should be bolded based on a machine learning model used by the MLLPU 120 having been trained to understand that headers of the particular type of document being worked on by the user are typically emphasized using bold and/or underlined text. Other contextual information may be provided by the application 105 which may be used to disambiguate the meaning of the input text.

The machine learning models used by the MLLPU 120 can also incorporate culture-specific and domain-specific understanding of the textual inputs. For example, different models may be used for different geographical regions and/or languages which may have different sentence structure and grammatical rules. Region or culture specific may models may be used for different English or Spanish speaking regions of the world. For example, different models may be used for British English versus North American English. The models may be even more fine grained and support various dialects of English, that may include vocabulary, grammatical rules, and/or slang that is specific to those dialects, such as but not limited to American English, Canadian English, Scottish English, Irish English, and/or other regional dialects of the English language. Similarly, different models may be provided for Peninsular Spanish (European Spanish) versus New World Spanish dialects. Again, fine-grained models may support various dialects of Spanish that may include vocabulary, grammatical rules, and/or slang that is specific to those dialects, such as but not limited to Chilean Spanish, Mexican Spanish, and Andalusian Spanish. Other models may be configured to support other languages and/or dialects thereof. The context information provided by the application 105 may include region information indicative of a geographical location in which the computing device is located, a language selected by the user, and/or other information that may be used to determine a model that may be used to determine a context of the input from the NLPU 115.

The MLLPU 120 may be configured to provide a context-sensitive understanding of textual inputs to determine whether a part of an audio input is intended to be textual content or intended to be a command acted upon by the application 105 in a context-sensitive manner. For example, the text output by the NLPU 115 may include "This is great! Italicize the last word." Ideally, the first half of the text, which includes the text "This is great!", should be interpreted as text content, while the second half of the text input should be interpreted as a command, which includes the text "Italicize the last word." The machine learning models used by the MLLPU 120 may be trained to identify a set of commands words or phrases that may typically be spoken by a user of the application 105. The machine learning models may be trained to identify a different set of commands for different types of applications, such as but not limited a web browser versus a messaging application. The machine learning models may be trained to identify specific sets of commands for specific applications.

The MLLPU 120 may be configured to provide a context-sensitive understanding of textual inputs to disambiguate phrases that sound similar and may be misinterpreted by the NLPU 115. For example, the command "insert table" sounds very much like the word "insertable" which may be included in textual input spoken by the user. The natural language models used by the NLPU 115 may or may not accurately determine whether utterance was meant to be a command or was meant to be a word included in the text. However, the machine learning models used by the MLLPU 120 may be trained to identify ambiguous words or phrases in included in the text output by the NLPU 115 and may make a determination whether the user intended to issue the command "insert table" or merely to include the word "insertable" in the textual content provided to the application 105. The MLLPU 120 may use the context information provided by the application 105 in addition to the text provided by the NLPU 115 to make a determination what the user intended to say and whether that utterance was a command or textual content. The machine learning model(s) used by the MLLPU 120 may look at the text before and/or after the utterance when determining the context. For example, the user may use the word "insertable" in a sentence with certain words, such as "insertable into" which may indicate that user intended to use the word "insertable" rather than issue the command "insert table." The machine learning model(s) may take into account the type of application being used by the user when disambiguating between multiple possible utterances. For example, the model may determine that the command "insert table" was more probable where the user is working in a spreadsheet application and is less likely if the user is working in a messaging application. These examples are intended to illustrate on example in which the machine learning model(s) of the MLLPU 120 may be used to resolve ambiguities in the language uttered by the user and do not limit the models to these specific examples.

The MLLPU 120 may be configured to trigger a disambiguation process in some implementations. The MLLPU 120 may be configured to trigger a disambiguation process in response to the model(s) used by the MLLPU 120 outputting multiple possible outputs where the MLLPU 120 is unable to distinguish between the outputs. The model(s) may have assigned similar confidence score or none of the outputs may have been assigned a high enough confidence score to make a decision. The MLLPU 120 or the CLPU 110 may be configured to render a user interface on the computing device of the user to present a list of choices to the user from which the user may select what was actually said by the user. The user interface may also include an option where the user may select enter text indicating what was actually said by the user if the list of options presented by the MLLPU 120 or the CLPU 110 is incorrect. In some implementations, if the user utterance is determined to be a command, the MLLPU 120 or the CLPU 110 may provide suggestions that more clearly articulate the command user was trying to say once the input has been disambiguated.

The MLLPU 120 may be configured to identify unimplemented commands based on user utterances and observed multi-modal actions. For example, the MLLPU 120 may obtain keyboard and/or mouse interactions with the application 105 with the context information received from the application 105. The MLLPU 120 may analyze the user utterances and interactions with the user interface of the application 105 to identify additional commands that may not yet be supported by the MLLPU 120 but the model(s) used by the MLLPU 120 could be trained to support voice commands for such utterances. This information may be crowdsourced across users by reporting such unsupported utterances to a cloud-based service associated with the MLLPU 120. For example, if more than a threshold number of users utter the command "watermark" and then perform a series of mouse and/or keyboard commands to execute the watermark functionality when the user realizes that the voice command is not supported, then the model(s) used by the MLLPU 120 may be trained to recognize "watermark" as a command rather than just textual content. In implementations where the MLLPU 120 utilized one or more models stored locally on the user device, the CLPU 110 may receive updates to the local model(s) from the cloud-based service to update the model(s) used by the MLLPU 120 to support commands added through crowdsourcing.

The CLPU 110 may include a corrective command unit 198 and a sequential command unit 199. The corrective command unit 198 may be configured to provide a means for a user to provide corrective commands responsive to the MLLPU 120 inferring an incorrect context for an utterance. For example, the MLLPU 120 may incorrectly infer a textual input to be a command or vice versa or may incorrectly infer the target text to which the command was intended to be applied. As a result of this incorrect inference, the actions taken by the application 105 may be quite different than what was intended by the user. In response, the user may issue a corrective command that causes the corrective command unit 198 to take one or more corrective actions. The corrective command may include a command word that triggers the MLLPU 120 to determine that the utterance includes a corrective command, and the MLLPU 120 may provide an indication in the context information provided to the CLPU 110 that the utterance was a corrective command.

In an example to illustrate this concept, the user may utter a command "No, <phrase to try again>" where the command word "no" is followed by a corrective command. In this example the user wanted the previous two sentences rendered in bold text, but the MLLPU 120 interpreted the command differently than what was intended by the user. The user may respond with the corrective command "No, bold the last two sentences." The MLLPU 120 may recognize that the command "No" followed by a corrective command indicates that the previously performed action was incorrect. The corrective command may be a restatement of a mixed-mode dictation that was previously spoken by the user. The corrective command may include a restatement of the mixed-mode dictation with an alternative phrasing. For example, the previous command may have been "bold that" and the machine learning model or models inferred a different meaning for "that" than was expected by the user. The user may then speak a corrective command "No, bold the last sentence." This example demonstrates how a corrective command may be implemented and does not limit the techniques disclosed herein to this specific example implementation.

The corrective command unit 198 may be configured to pre-process the textual representation of the current utterance to identify keywords and/or phrases that may indicate that an utterance includes a corrective command. The corrective command unit may be configured to provide the context information for the previous utterance and the textual representation of the current utterance to the MLLPU 120 to obtain context information for the current utterance. The machine learning model or models of the MLLPU 120 may use the previous context information and the textual representation of the current utterance to determine the context information for the current utterance. The context information for the current utterance may indicate that a corrective command has been received and that the previously determined inference by the MLLPU 120 was not correct. As a result, the textual content and/or commands provided to the application 105 by the CLPU 110 was not what was intended by the user. The corrective command unit 198 may be configured to send a command or commands to the application 105 to undo the previously executed command or command and/or to textual content added to the document being created or edited using the application 105. In some implementations, the application 105 may implement and undo feature that allows the contents of the document being created or modified in the application 105 to be reverted to a previous state prior to the previous command being executed. In other implementations, the CLPU 110 may maintain a list of commands that have been executed on the document and the changes that were made to the document by each command. The CLPU 110 may then issue one or more commands to restore the state of the document to the previous state. In yet other implementations, the CLPU 110 may obtain from the application 105 a current state of the document being created or modified using the application 105 prior to the CLPU 110 sending a command to the application 105 to be executed on the document and after the sending the command to the application 105. The CLPU 110 may then send a command or commands to the application 105 to restore the document to the state prior to the command being executed.

The corrective command unit 198 may also be configured to provide feedback information to the training unit 185. The training unit 185 may be configured to update the machine learning models used by the MLLPU 120. The training unit 185 may be configured to send model update information to the one or more local ML models 190*a* and/or the one or more remote ML models 190*b*. The model update information may include information that may be used to update the one or more local ML models 190*a* and/or the one or more remote ML models 190*b* based on the corrective command from the user. The information included in the model update information may depend upon the type of ML model or models being used. The training unit 185 provides a technical benefit of allowing the one or more local ML models 190*a* and/or the one or more remote ML models 190*b* to be continually updated in response to feedback provided by users through corrective feedback.

In some implementations, the corrective command unit 198 may be configured to reinforce the training of the machine learning model or models in response to correct inferences made by the machine learning model or models. The corrective command unit 198 may be configured to determine that the machine learning model or models have made a correct interference of an utterance through explicit and/or implicit feedback from the user. The user may provide explicit feedback through an utterance that includes a keyword or phrase that the indicates that the preceding command was correctly processed. For example, the user may utter the phrase "Yes, that is correct." The user may utilize explicit feedback in situations where a previous inference made by the machine learning model or models was incorrect and a corrective command followed the incorrect inference. The user may provide explicit feedback that the corrective command was processed correctly. The user may provide implicit feedback that an inference made by the MLLPU 120 was correct by continuing to dictate additional textual content and/or issuing additional commands via an utterance or utterances. In this context, the corrective command unit 198 may infer that the inferences of the context of the preceding utterance or utterances were correct and the commands and/or textual content dictated by the user was processed by the application 105 as expected. The corrective command unit 198 may provide positive feedback to the training unit 185 to reinforce the correct inferences made by the one or more machine learning models used by the MLLPU 120.

Figure 9:
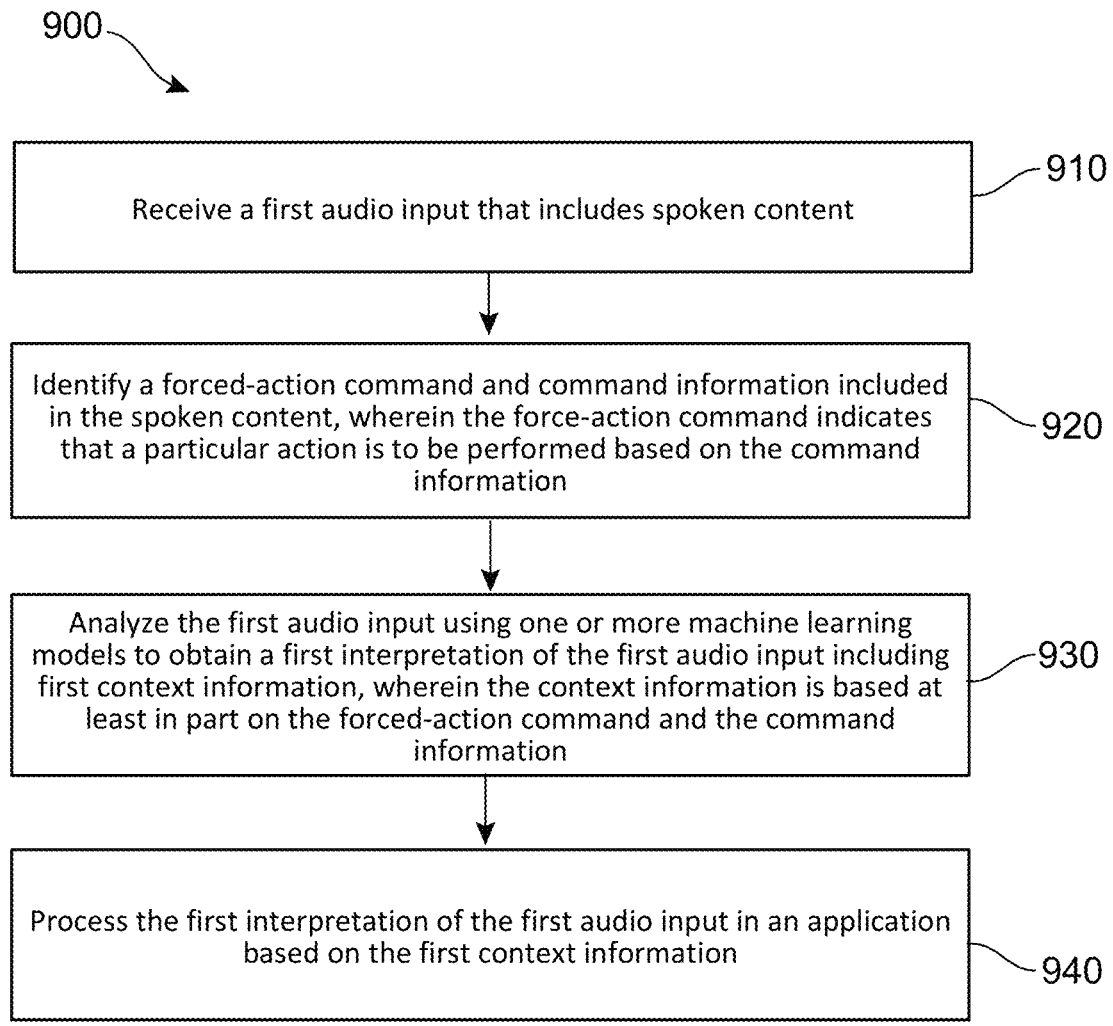
FIG. 9 is a flow chart illustrating an implementation of another example process executed by a data processing system for processing mixed-mode dictation from a user.

The forced-action command unit 194 may be configured to pre-process the textual representation of the current utterance to identify keywords and/or phrases that may indicate that an utterance includes a forced-action command. The forced-action command unit 194 of the CLPU 110 may be configured to recognize certain commands that force a particular action to be performed. Such forced-action commands may be used in situations where the intent of the user may have otherwise been unclear, and the user would like to force the utterance to be interpreted with a particular context. Examples of such force-action commands are shown in FIGS. 3, 4, and 9, which will be discussed in detail below.

The training unit 185 may be configured to generate and/or update training data stored in the training data store 195. The training data store 195 may include a persistent memory that is configured to store training data that may be used to train instances of the machine learning models used to implement the one or more local ML models 190*a* and/or the one or more remote ML models 190*b*. While the training data store 195 is shown as a single data store in the example implementation of FIGS. 1A and 1B, the training data store 195 may be implemented as multiple data stores that may be distributed across multiple computing systems. For example, the one or more local ML models 190*a* and/or the one or more remote ML models 190*b* may have separate training data stores that store the training data used to train the respective machine learning models. The training data store 195 may be configured to generate new training data based on the corrective feedback received from the users and/or to modify or delete existing training data that may be related to the incorrect inference of what the user had intended by a particular utterance.

The sequential command unit 199 may be configured to detect sequential commands that may be issued in a series of utterances. Sequential commands are a series of more than one command that are issued in a series of consecutive utterances. Each of the sequential commands may be applied to a same set of target text or may be applied to a different set of target text. Sequential commands may be misinterpreted if analyzed alone by the ML. For example, the user may issue a command first command "Bold the last two sentences" followed by a second command "And underline that." The inclusion of the word "and" at the beginning of the utterance in this example indicates that the user intended to have the application 105 render the last two sentences as underlined text in addition to being bolded. Examples of such sequential commands are shown in FIGS. 3, 4, and 9, which will be discussed in detail below.

The sequential command unit 199 may be configured to determine that an utterance is not a sequential command if the context of the previous utterance was determined to not include a command. The sequential command unit 199 may also be configured to determine that an utterance is not a sequential command if more than a predetermined period of time passes between the time that a current utterance and the previous utterance by the user. For example, the sequential command unit 199 may be configured to determine that an utterance is not a sequential command if more than 15 seconds elapsed between the beginning of the current utterance and the end of the previous utterance. This example is intended to illustrate one possible implementation of this functionality of the sequential command unit 199 and is not intended to limit the sequential command unit 199 to this specific predetermined period of time between utterances. Some implementations may utilize a longer or shorter predetermined gap between the beginning of the current utterance and the end of the previous utterance. Furthermore, this period of time parameter may be configurable by the user in some implementations, while yet other implementations may not include this feature. The sequential command unit 199 may provide an indication to the MLLPU 120 that the previous command was not a command, and the MLLPU 120 may use this information to eliminate potential inferences about the context of the utterance that indicate that the utterance was a sequential command.

The sequential command unit 199 may be configured to pre-process the textual input to the MLLPU 120 to identify keywords and/or phrases that may indicate that an utterance includes a sequential command. Various words or phrases may be used to indicate a sequential command, including but not limited to "and," "also," "additionally," "too," or "as well." When the sequential command unit 199 detects what may be a sequential command, the sequential command unit 199 may provide the context information from the preceding utterance to the MLLPU 120 in addition to the textual representation of the current utterance so that the machine learning model or models used by the MLLPU 120 may use this context information when analyzing the textual representation of the current utterance.

FIG. 1B is a block diagram illustrating additional details of the example computing environment illustrated in FIG. 1A. The example illustrated in FIG. 1B illustrates the data elements that are passed among the various components of the computing environment 100.

The application 105 may capture an audio input 125 from a user. The audio input 125 may be captured using a microphone of the user's computing device. The audio input 125 may include spoken content that includes a command, textual content, or both. The application 105 may provide the audio input 125 and context information 130 to the CLPU 110. The context information 130 may include additional information identifying the application 105, regional information and/or language information identifying a language and/or dialect that may be spoken by the user, and/or other information that may be provided by the application that may be used to disambiguate the meaning of the spoken content. The application 105 may obtain at least a portion of the context information from an operating system of the computing device. The context information 130 may include cursor or insertion point (IP) location information and/or other information that indicates how the user was interacting with the application prior to, during, or after issuing a voice command. The cursor or IP location information may be used to disambiguate how the command is to be applied to textual content being dictated and/or revised by the user.

The CLPU 110 receives the audio input 125 and the optional context information 130 from the application 105. The CLPU 110 may output audio input(s) 140 to the NLPU 115. The NLPU 115 is configured to convert the spoken language included in the audio input(s) 140 to textual content. The audio input(s) 140 may be the same as the audio input 125 or the CLPU 110 may process the audio input 125 to generate the audio input(s) 140 for one or more natural language processing modules associated with the NLPU 115. For example, the CLPU 110 may preprocess the audio input 125 to filter out background noise, to convert the audio input 125 to a format that may be processed by one or more natural language processing models utilized by the NLPU 115, and/or other processing of the audio signal that may facilitate the one or more natural language processing models recognition of spoken content in the audio input 125. The CLPU 110 may output more than one audio input 140 for the NLPU 115 for use by one or more natural language processing models.

The NLPU 115 may be associated with one or more local natural language processing (NLP) models 180a, one or more remote NLP models 180b, or both. The local NLP models 180a may be implemented on the user's computing device, such as the user device 205 depicted in FIG. 2. The remote NLP models 180b may be implemented on one or more servers remote from the user's computing device that are accessible via one or more network connections. The remote NLP models 180b may be implemented by the speech processing cloud services 225 illustrated in FIG. 2 and discussed in detail in the examples the follow.

The NLPU 115 may be configured to provide the audio input(s) 150a to the local NLP models 180a and the audio input(s) 150b to the remote NLP models 180b. In some implementations, the NLPU 115 may preprocess the audio input(s) received from the CLPU 110 to filter out background noise, to convert the audio input(s) 140 to a format that may be processed by one or more local or remote natural language processing models utilized by the NLPU 115, and/or other processing of the audio signal that may facilitate the one or more natural language processing models recognition of spoken content in the audio input 140. Each NLP model used by the NLPU 115 may provide a textual output and a confidence score to the NLPU 115, such as the textual output(s) and confidence score(s) 155a from the local NLP models 180a and the textual output(s) and confidence score(s) 155b from the remote NLP models 180b. The textual output from each NLP model represents that particular model's interpretation of the spoken content included in the audio signal provided to the model. The NLP model may also output a confidence score that represents an estimated probability of correctness of the textual output by that model. The calculation of the confidence score may be dependent upon the implementation of the NLP model. The NLPU 115 may be configured to select a textual output from one of the NLP models, where more than one NL model is used, to output as the text output 145. The NLPU 115 may select the textual output associated with the highest confidence score. In some implementations, the NLPU 115 may only use one remote or one local NLP model to generate the textual output. In such implementations, the NLPU 115 may output the textual output from that model without considering a confidence score associated with the textual output.

The CLPU 110 may provide the text output 145 as a text input 160 to the MLLPU 120. The CLPU 110 may also provide command information to the MLLPU 120 if the sequential command unit 199 infers that the current utterance may include a sequential command. The CLPU 110 may also provide command information to the MLLPU 120 if the corrective command unit 198 infers that the current utterance may include a corrective command. The command information may include the context information associated with the previous command and/or other information that the machine learn model or models of the MLLPU 120 may use to infer the context of the current utterance represented by the text input 160. The MLLPU 120 may provide the text input 160 and/or the command information to one or more local machine learning (ML) models 190a and/or one or more remote ML models 190b. The one or more local ML models 190a may be implemented on the user's computing device, such as the user device 205 depicted in FIG. 2. The remote ML models 190b may be implemented on one or more servers remote from the user's computing device that are accessible via one or more network connections. The remote ML models 190b may be implemented by the speech processing cloud services 225 illustrated in FIG. 2 and discussed in detail in the examples the follow.

Each ML model may be configured to receive the text input 160 (via the links 165a and 165b), the optional context information 130 from the application 105, and/or previous command information associated with a corrective command or a sequential command. As discussed above, the context information 130 may include language and/or dialect information, location of the cursor or IP within the text of a document being edited using the application, and/or other information that may be used to determine the context of the textual content output by the NLPU 115. The context information may also include at least a portion of the textual content that has already included in the document being edited in the application 105. The textual content included with the context information may be used by the ML model(s) in situations where the spoken content included in the audio input includes a command but no text to which the command is to be applied. Each ML model may output context information and a confidence score associated with that confidence information.

The local ML models 190a may provide the context information and confidence score(s) 170a, and the remote ML models 190b may provide the context information and confidence score(s) 170b. The context information may include an indication of whether the textual input provided to the ML model included at least one command and information indicating how the user intended to apply that command to textual content included in the textual input and/or existing textual content that has already been added to the document being edited in the application 105. The confidence score represents an estimated probability of correctness of the context information output by that model.

The MLLPU 120 may select context information received from a plurality of ML models based on the confidence scores associated with the ML models. The MLLPU 120 may select context information that is associated with a highest confidence score and output that context information as context information 175 to the CLPU 110. The CLPU 110 may use the context information 175 to determine text content and/or commands 135 to be provided to the application 105. The text content includes textual content that was dictated by the user and includes in the audio input 125. The command information may include one or more commands to be performed on textual content by the application 105. The command information may identify which text on which each command is to be performed.

The corrective command unit 198 may also be configured to provide feedback information 197 to the training unit 185. The training unit 185 may be configured to update the machine learning models used by the MLLPU 120 by providing model update information 187a to the one or more local models 190a and/or model update information 187b to the one or more remote models 190b. The model update information 187a and 187b may include information that may be used to update the one or more local ML models 190a and/or the one or more remote ML models 190b based on the corrective command from the user. The information included in the model update information may depend upon the type of ML model or models being used.

The training unit 185 may be configured to generate and/or update training data update information 186 to update training data stored in the training data store 195. The training data update information 186 may include information that may be used to generate training data for the one or more local ML models 190*a* and/or the one or more remote ML models 190*b*.

Figure 2:
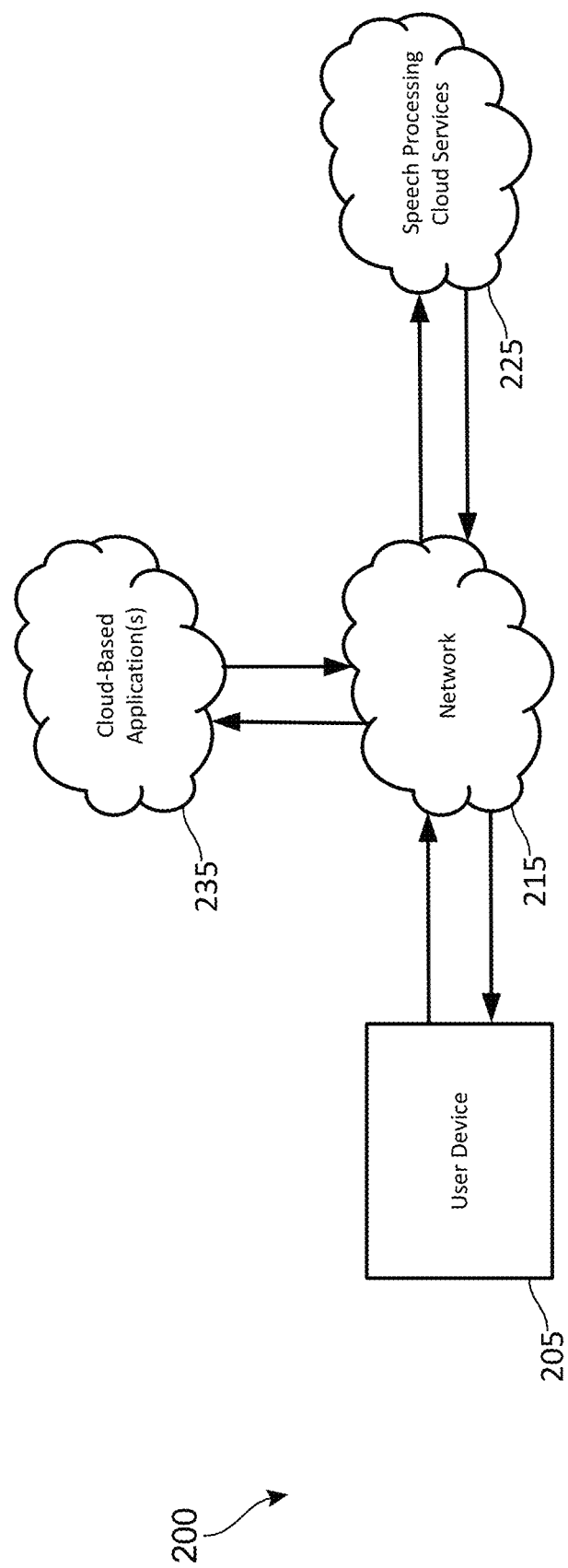
FIG. 2 is a block diagram of an example computing environment in which the techniques disclosed herein may be implemented.

FIG. 2 illustrates a block diagram of an example computing environment 200 in which the techniques disclosed herein may be implemented. The application 105 may be implemented on the user device 205 or the application 105 may be implemented as a cloud-based application 235 that is accessible from a web browser or other similar interface on the user device 205. As discussed in the preceding examples, the user device 205 may be a personal computer (PC), a tablet computer, a laptop computer, a netbook, a gaming and/or entertainment system, a smart phone, a mobile device, a wearable device, a kiosk, a point of sale device, or other type of computing device. The speech processing cloud services 225 may be configured to implement at least a portion of the CLPU 110 illustrated in FIGS. 1A and 1B. The CLPU 110 may be implemented on the user device 205 and/or on the speech processing cloud services 225. Furthermore, one or more models used by the NLPU 115 and/or the MLLPU 120 may be implemented by the speech processing cloud service 225 and/or on the user device 205.

FIG. 3 is an example showing processing of a forced-action command in mixed mode dictation. The processing of a forced-action command in mixed-mode processing may be implemented by the forced-action command unit 194 of the CLPU 110. The forced-action command unit 194 of the CLPU 110 may be configured to recognize certain commands that force a particular action to be performed. Such forced-action commands may be used in situations where the intent of the user may have otherwise been unclear, and the user would like to force the utterance to be interpreted with a particular context.

FIG. 3 provides an example of a forced-action command in which the user may say the command "type" followed by a phrase to be typed as text. For example, the user may recite the utterance "Type question mark" where the user would like the phrase "question mark" to be typed as text in the application 105 rather than being interpreted to refer to the punctuation mark. Similarly, the CLPU 110 may recognize a second command of the format "punctuation <phrase to be typed as punctuation>" to identify a phrase that is to be rendered as a punctuation mark rather than simple text. In the example shown in FIG. 3, an example command of the format "Type <phrase to be typed as text>" is described. For example, the user may recite the utterance "Punctuation question mark" where the user would like the phrase "question mark" to be typed as a punctuation mark in the application 105 rather than being interpreted type out the words "question mark" in text.

FIG. 4 is another example showing processing of a forced-action command in mixed-mode dictation which may be implemented by the forced-action command unit 194 of the CLPU 110. In the example illustrated in FIG. 4, the CLPU 110 may be configured to recognize a "command" forced-action command that causes the CLPU 110 to interpret the phrase following the term "command" as a command to be executed by the application 105. In the example of FIG. 4, a first utterance "The quick brown fox jumped over the lazy dog" is received and correctly interpreted as text to be added to the document being created or modified by the application 105. A second utterance of "command bold that" follows the first utterance. The use of the word forced-action command "command" indicates that the phrase "bold that" is intended to be interpreted as a command. The CLPU 110 may provide command information to the MLLPU 120 that indicates that the phrase "bold that" is intended to be interpreted as a command. The MLLPU 120 may then analyze the phrase to determine the context of the command and what is intended to be rendered in bold text. In the example illustrated in FIG. 4, the previous sentence of text that was dictated may be rendered in bold. The MLLPU 120 may determine that in this particular context "that" refers to the previous utterance which was dictated text.

FIG. 5 is an example showing processing of a corrective commands in mixed-mode dictation. The corrective command unit 198 may be configured to determine that a corrective command has been uttered as described in the preceding examples. In the example of FIG. 5, the corrective command unit 198 may detect that the user has issued a corrective command. The corrective command may include a keyword or phrase that indicates that the context of a previous utterance may have been misinterpreted by the MLLPU 120, which can result in the application 105 performing an undesired action in response to the user utterance.

In the example shown in FIG. 5, the corrective command 505 takes the form "No <phrase to try again>" where the keyword "no" indicates that a previous utterance made by the user was interpreted incorrectly from the user's standpoint. The keyword is then followed by a phrase to be reassessed by the MLLPU 120.

In the example of FIG. 5, the user dictates some text in a first utterance 510, which is correctly interpreted into the textual interpretation 515. The first utterance 510 is followed by a second utterance 520 which is a command "Command bold that." In this context, second utterance 520 should have been interpreted by the MLLPU 120 to be a command to bold the text of the first utterance 510. Instead, an incorrect interpretation 525 of the first utterance was produced in which the second utterance 520 was incorrectly interpreted to be textual content. A corrective command 530 is then received that indicates that the previous command was interpreted incorrectly and a corrective action "bold the last sentence" is provided. The corrective action indicates what should have been in response to the second utterance 520. The corrective command unit 198 may undo the changes that were made to the text based on the incorrect interpretation of the second utterance 520 and then apply the bold text command to the sentence. The correct interpretation 535 results from processing of the corrective command.

FIG. 6 is an example showing processing of sequential commands in mixed-mode dictation. The sequential command unit 199 of the CLPU 110 may be configured to identify a sequential command and to provide command information to the MLLPU 120 that indicates that a sequential command has been received so that the MLLPU 120 is more likely to infer the correct context for the sequential command. Sequential commands are a series of more than one command that are issued in a series of consecutive utterances. Each of the sequential commands may be applied to a same set of target text or may be applied to a different set of target text.

In the example shown in FIG. 6, the sequential command 605 takes the form "Also <subsequent command>" where the keyword "also" indicates that a sequential command to be performed is included in the utterance. The keyword is then followed by a command to be interpreted by the MLLPU 120 which may determine a context of the command. The context of the command may identify the target text upon which the sequential command is to be performed.

The example of FIG. 6 includes an example utterance 610 that includes a textual input. The MLLPU 120 correctly infers that the example utterance 610 is textual content and outputs the interpretation 615 of the utterance. A first command 620 is then received "Command bold that" which includes a forced-action command, which may be identified and processed as discussed in the preceding examples. The MLLPU 120 correctly infers that the term "that" in this example refers to the sentence of textual content represented by the example utterance 610. The CLPU 110 issues a command to the application 105 to bold the text of the sentence to produce the correct interpretation 625. A sequential command 630 "Also, underline that" is then received. The sequential command unit 199 of the CLPU 110 determines that the command 630 is a sequential command based on the usage of the term "also" as the beginning of the utterance. The MLLPU 120 then analyzes the sequential command "underline that" to infer the context of the term "that" as used in the utterance. In the example illustrated in FIG. 6, the MLLPU 120 analyzes the sequential command to infer that "underline that" in this context means underline the sentence which was rendered in bold text in response to the first command 620. The correct interpretation 635 is shown.

Figure 7:
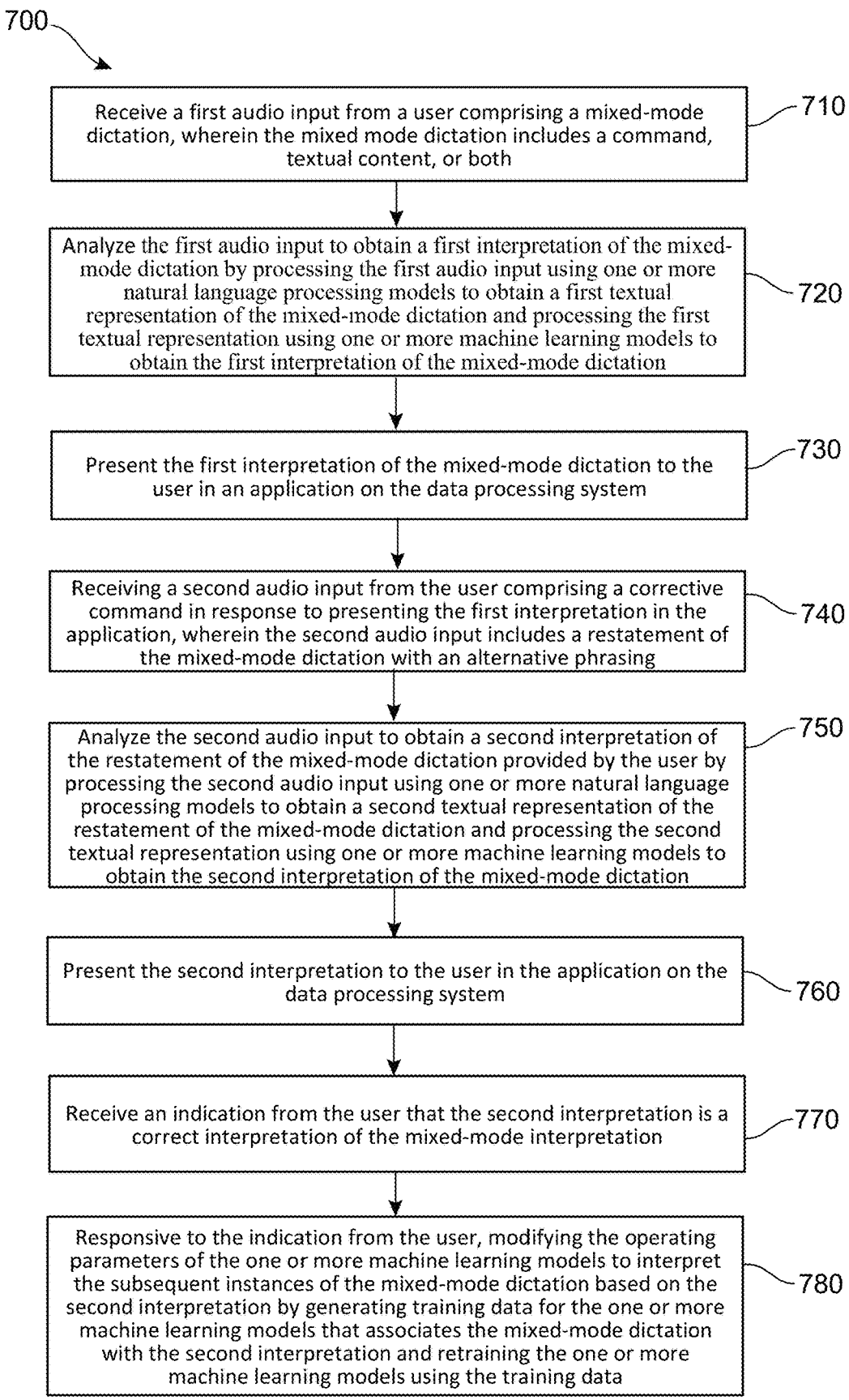
FIG. 7 is a flow chart illustrating an implementation of an example process executed by a data processing system for processing mixed-mode dictation from a user.

FIG. 7 is a flow chart illustrating an implementation of an example process 700 executed by a data processing system for processing mixed-mode dictation from a user. Mixed-mode dictation refers to the user dictating spoken content to be converted to textual output and issuing of voice commands without an external signal to switch between the textual output mode and the voice command mode. Such an external signal may be a button push, a gesture, or other signal indicative of a switch between the textual output mode and the voice command mode. The mixed-mode techniques disclosed herein allow a user to dictate a both textual content and voice commands without disrupting the user experience by requiring the user provide an external (non-voice) signal to switch between the two modes of operation.

The process 700 may be implemented by the corrective command unit 198 of the CLPU 110 illustrated in the preceding examples. The process 700 may be implemented by a data processing system similar to the data processing machine 1100 of FIG. 11. Furthermore, the process 700 shown in FIG. 7 may include operations in addition to those shown in FIG. 7, may omit one or more of the operations shown in FIG. 7 or elements thereof, and/or may perform one or more of the operations in a different order than described herein.

The process 700 may include an operation 710 of receiving a first audio input from a user that includes a mixed-mode dictation. As discussed in the preceding examples, a user may dictate textual content for an application and/or may provide voice commands to be executed by the application. Thus, the mixed-mode dictation may include a command, textual content, or both.

The process 700 may include an operation 720 of analyzing the first audio input to obtain a first interpretation of the mixed-mode dictation by processing the first audio input using one or more natural language processing models to obtain a first textual representation of the mixed-mode dictation and processing the first textual representation using one or more machine learning models to obtain the first interpretation of the mixed-mode dictation. As discussed in the preceding examples, the first audio input may be processed by the NLPU 115 to obtain a text output 145 which may be provided as an input 160 to the MLLPU 120. The MLLPU 120 may analyze the text input 160 to obtain context information 175. The context information may include an indication of whether the textual input provided to the ML model included at least one command and information indicating how the user intended to apply that command to textual content included in the textual input and/or existing textual content that has already been added to the document being edited in the application 105. The context information may also be associated with a confidence score that represents an estimated probability of correctness of the context information output by that model.

The process may include an operation 730 of presenting the first interpretation of the mixed-mode dictation to the user in an application 105 on the data processing system. The first interpretation may be presented to the user by the application 105 by executing a command, rendering textual content, or both included in the mixed-mode dictation.

The process 700 may include an operation 740 of receiving a second audio input from the user comprising a corrective command in response to presenting the first interpretation in the application, where the second audio input includes a restatement of the mixed-mode dictation with an alternative phrasing. For example, the if the first audio input included the command "bold that" but the first interpretation of the term "that" was different than that anticipated by the user, the user may provide a corrective command that clarifies what was intended. For example, the corrective command may include a second interpretation of the previously issued command that states "bold the last sentence" instead of the phrase "bold that" used in the first audio input.

The process 700 may include an operation 750 of analyzing the second audio input to obtain a second interpretation of the restatement of the mixed-mode dictation provided by the user by processing the second audio input using one or more natural language processing models to obtain a second textual representation of the restatement of the mixed-mode dictation and processing the second textual representation using one or more machine learning models to obtain the second interpretation of the mixed-mode dictation. The second audio input may be processed by the NLPU 115 to obtain a text output 145 which may be provided as an input 160 to the MLLPU 120. The MLLPU 120 may analyze the text input 160 to obtain context information 175. The context information may include an indication of whether the textual input provided to the ML model included at least one command and information indicating how the user intended to apply that command to textual content included in the textual input and/or existing textual content that has already been added to the document being edited in the application 105. The context information may also be associated with a confidence score that represents an estimated probability of correctness of the context information output by that model.

The process 700 may include an operation 760 of presenting the second interpretation of the restatement of the mixed-mode dictation to the user in an application 105 on the data processing system. The second interpretation may be presented to the user by the application 105 by executing a command, rendering textual content, or both included in the mixed-mode dictation.

The process 700 may include an operation 770 of receiving an indication from the user that the second interpretation is a correct interpretation of the mixed-mode dictation. The corrective command unit 198 may be configured to determine that the machine learning model or models have made a correct interference of an utterance through explicit and/or implicit feedback from the user. The user may provide explicit feedback through an utterance that includes a keyword or phrase that the indicates that the preceding command was correctly processed. The user may provide implicit feedback that an inference made by the MLLPU 120 was correct by continuing to dictate additional textual content and/or issuing additional commands via an utterance or utterances.

The process 700 may include an operation 780 of, responsive to the indication from the user, modifying the operating parameters of the one or more machine learning models to interpret the subsequent instances of the mixed-mode dictation based on the second interpretation by generating training data for the one or more machine learning models that associates the mixed-mode dictation with the second interpretation and retraining the one or more machine learning models using the training data. The training unit 185 may be configured to update the machine learning models used by the MLLPU 120. The training unit 185 may be configured to send model update information to the one or more local ML models 190a and/or the one or more remote ML models 190b. The model update information may include information that may be used to update the one or more local ML models 190a and/or the one or more remote ML models 190b based on the corrective command from the user.

Figure 8:
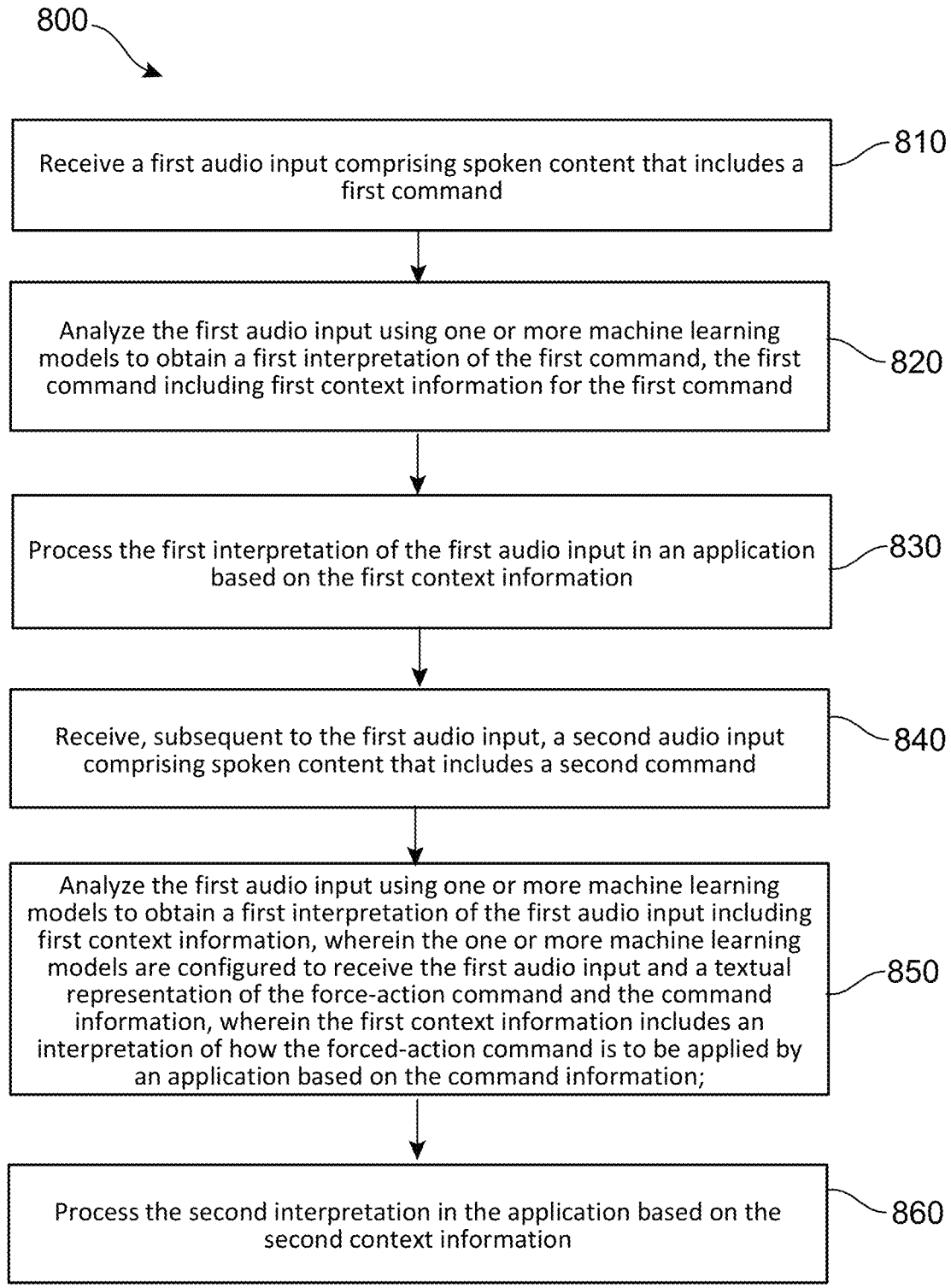
FIG. 8 is a flow chart illustrating an implementation of an example process executed by a data processing system for processing sequential commands in mixed-mode dictation from a user.

FIG. 8 is a flow chart illustrating an implementation of an example process 800 executed by a data processing system for processing sequential commands in mixed-mode dictation from a user. The process 800 may be implemented by the sequential command unit 199 of the CLPU 110 illustrated in the preceding examples. The process 800 may be implemented by a data processing system similar to the data processing machine 1100 of FIG. 11. The process 800 shown in FIG. 8 may include operations in addition to those shown in FIG. 8, may omit one or more of the operations shown in FIG. 8 or elements thereof, and/or may perform one or more of the operations in a different order than described herein.

The process 800 may include an operation 810 of receiving a first audio input that includes first spoken content where the first spoken content includes a first command. The spoken content may include a command, textual content, or both. The textual content may be target text on which the command is to be performed. For example, the first command may be "bold the last sentence" in which the command is "bold", and the target text is "the last sentence" that was dictated.

The process 800 may include an operation 820 of analyzing the first audio input using one or more machine learning models to obtain a first interpretation of the command. The first interpretation may include context information for the first command. The first audio input may be processed by the NLPU 115 to obtain a textual output that represents the spoken contents included in the first audio input. The textual output 145 from the NLPU 115 may be provided as input 160 to the MLLPU 120 to determine context information 175 for the first audio input. The context information may include an indication of whether the textual input provided to the ML model included at least one command and information indicating how the user intended to apply that command to textual content included in the textual input and/or existing textual content that has already been added to the document being edited in the application 105. The context information may also be associated with a confidence score that represents an estimated probability of correctness of the context information output by that model.

The process 800 may include an operation 830 of processing the first interpretation of the first audio input in an application 105 based on the first context information. The MLLPU 120 provides context information 175 to the CLPU 110. The CLPU 110 may use this context information to determine whether the provide textual content and/or one or more commands 135 to the application 105 to be executed by the application 105. The application 105 may then perform one or more commands that may format or otherwise modify contents of the document being created or modified using the application 105.

The process 800 may include an operation 840 of receiving, after the first audio input, a second audio input that includes second spoken content where the second spoken content includes a second command. The second spoken content may include a command, textual content, or both. The textual content may be target text on which the command is to be performed. The second command may be a sequential command which is part of a series of more than one command that are issued in a series of consecutive utterances. Each of the sequential commands may be applied to a same set of target text or may be applied to a different set of target text.

The process 800 may include an operation 850 of analyzing the second audio input using the one or more machine learning models to obtain a second interpretation of the second command where the second interpretation includes second context information for the second command. The second interpretation is based at least in part on the first context information associated with the first command. For example, the first command may be "Bold the last sentence" and the second command may be "Also, underline that." The second command is "underline" and the target text "that" may be inferred to refer to the last sentence that was dictated based on the first context information associated with the first command. The first context information associated with the first audio input may be used to help determine whether the second command is a sequential command. For example, if the first context information indicates that the first audio input was all text input and did not include a command, then the second command included in the second audio input is not a sequential command. The use of the term "also" may be recognized by the sequential command unit 199 as an indication that the second spoken content includes a sequential command as described in the preceding examples. Other terms and/or phrases may also be recognized as possible indicators of a sequential command, such as but not limited to "next" or "then."

The process 800 may include an operation 860 of processing the second textual output in the application based on the second context information. As discussed in the preceding examples, the CLPU 110 may provide textual content and/or one or more commands 135 to the application 105 to be executed by the application. The second context information used to generate the textual content and/or one or more commands 135 is based at least in part on the first context information associated with the first audio input. Thus, if the first audio input is inferred to include a first command and the second audio input is inferred to include a second command in a sequence of commands, the CLPU 110 may generate a second command to be performed by the application 105 that acts upon a same target text as the first command in a manner similar to that show in the example of FIG. 6.

FIG. 9 is a flow chart illustrating an implementation of an example process 900 executed by a data processing system for processing mixed-mode dictation from a user. The process 900 may be implemented by the forced-action command unit 194 of the CLPU 110 illustrated in the preceding examples. The process 900 may be implemented by a data processing system similar to the data processing machine 1100 of FIG. 11. Example of forced-action commands are shown in FIGS. 3 and 4. Other types of forced-action commands may be supported in addition to or instead of the examples shown in FIGS. 3 and 4. The process 900 shown in FIG. 9 may include operations in addition to those shown in FIG. 9, may omit one or more of the operations shown in FIG. 9 or elements thereof, and/or may perform one or more of the operations in a different order than described herein.

The process 900 may include an operation 910 of receiving a first audio input that includes spoken content. As discussed in the preceding examples, a user may dictate textual content for an application and/or may provide voice commands to be executed by the application. Thus, the spoken content may include a command, textual content, or both. In this example process, the spoken content includes a forced-action command. Such forced-action commands may be used in situations where the intent of the user may have otherwise been unclear, and the user would like to force the utterance to be interpreted with a particular context.

The process 900 may include an operation 920 of identifying a forced-action command and command information included in the spoken content. FIGS. 3 and 4 show some examples of forced-action commands. The forced action commands may include a keyword or phrase that indicates that the spoken content includes a forced-action command. The audio input that includes the spoken content may be processed by the NLPU 115 to generate a textual output that represents the spoken contents of the first audio input, and the textual output may be analyzed by the CLPU 110 to identify keywords or phrases that may indicate that the user has spoken a force-action command. Examples shown in FIGS. 3 and 4 demonstrate two formats that a command that includes a force-action command may follow. One format of the forced-action commands is of the form "command <command information>" where the user speaks the word "command" to indicate that the command information that follows the word "command" should be interpreted to be a command and not textual content. The command information may include a command to be performed and may optionally include command target information. The command target information identifies the content to which the command it be applied. For example, referring to FIG. 4, the user may speak the command "bold that" after the force-action command word "command" has been spoken. The command "bold that" will then be treated as a command rather than textual input. The MLLPU 120 will analyze the command "bold that" to infer the meaning of the term "that" and provide context information to the CLPU 110. Another format of the forced-action commands is of the form "type <command information>" where the user speaks the word "type" to indicate that the command information that follows the word "type" should be interpreted to be textual content and not a command. Yet another example of a forced-action commands is of the form "punctuation <command information>" where the user speaks the word "punctuation" to indicate that the command information that follows the word "punctuation" should be interpreted to be a punctuation mark rather than typing out the textual content.

The process 900 may include an operation 930 of analyzing the first audio input using one or more machine learning models to obtain a first interpretation of the first audio input including first context information 175. The one or more machine learning models are configured to receive the first audio input and a textual representation of the force-action command and the command information. The context information 175 is based at least in part on the forced-action command and the command information and includes an interpretation of how the forced-action command is to be applied by an application based on the command information. The one or more machine learning models of the MLLPU 120 may output context information 175 that may provide an indication whether the first audio input included a command and information indicating how the command is to be applied to the textual content of the document being created or modified using the application 105.

The process 900 may include an operation 940 of processing the first interpretation of the first audio input in an application based on the first context information. As discussed in the preceding examples, the CLPU 110 may provide textual content and/or one or more commands 135 to the application 105 to be executed by the application. The context information used to generate the textual content and/or one or more commands 135 is based at least in part on the forced-action command and the command information. The example forced-action commands shown in FIGS. 3 and 4 demonstrate how the application 105 may execute the command and/or render the textual content provided by the CLPU 110.

The detailed examples of systems, devices, and techniques described in connection with FIGS. 1-9 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-9 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 10:
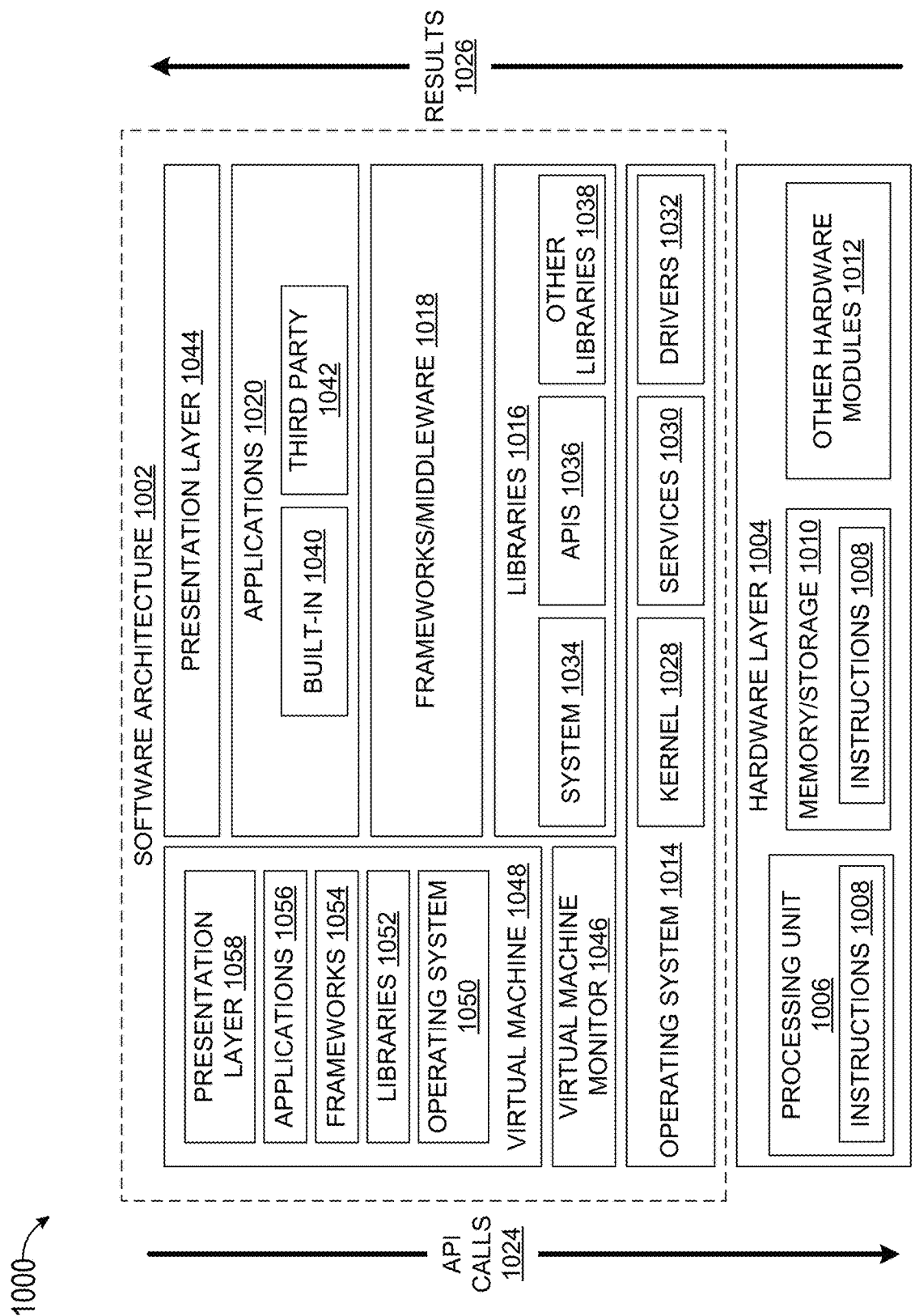
FIG. 10 is a block diagram illustrating an example software architecture, various portions of which may be used in conjunction with various hardware architectures herein described, which may implement any of the features herein described.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
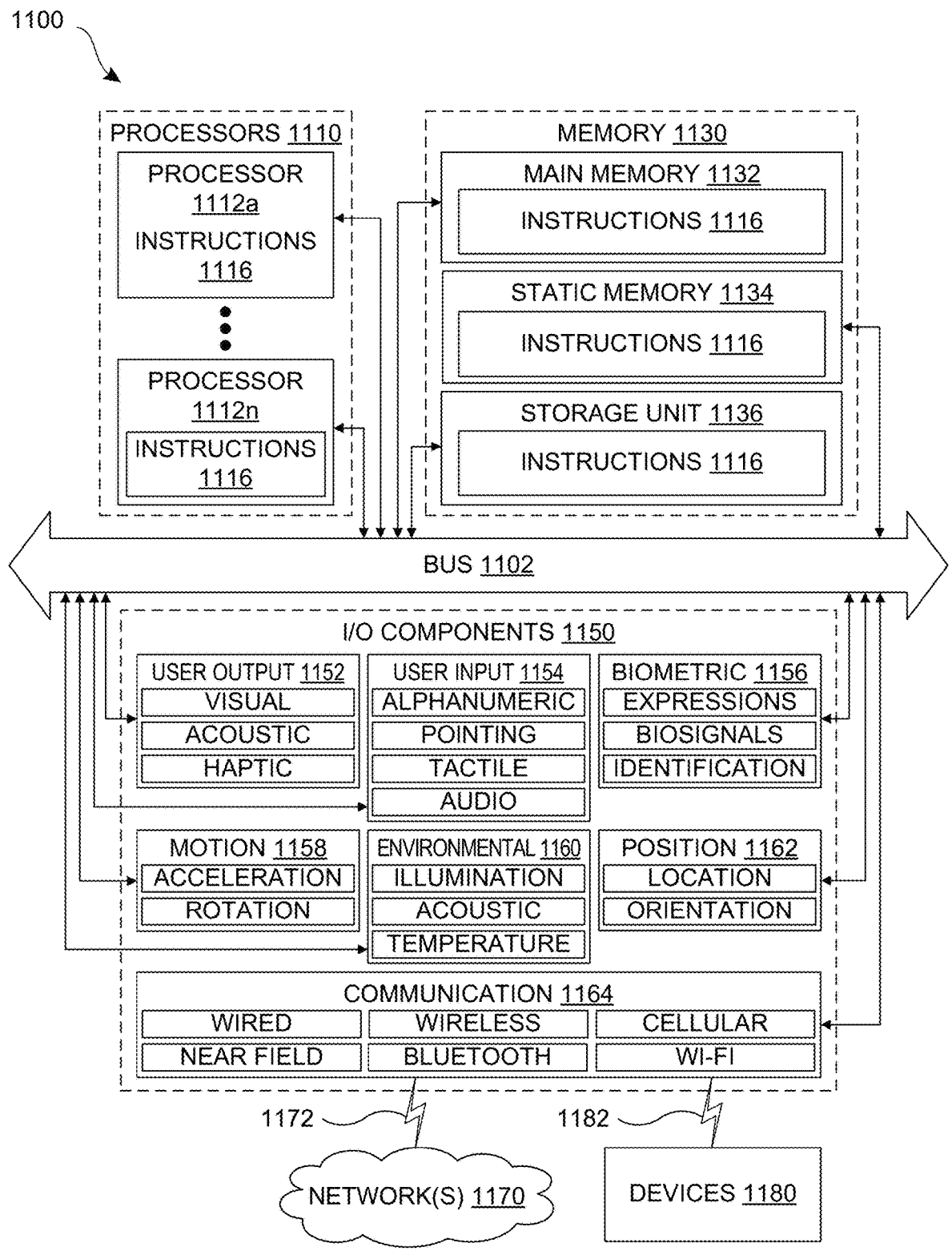
FIG. 11 is a block diagram illustrating components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors $1112a$ to $1112n$ that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations of:
      receiving a first audio input from a user comprising a mixed-mode dictation, wherein the mixed-mode dictation includes a command to be executed by an application on the data processing system, textual content to be rendered by the application, or both;
      analyzing the first audio input to obtain a first interpretation of the mixed-mode dictation by processing the first audio input using one or more natural language processing models to obtain a first textual representation of the mixed-mode dictation and processing the first textual representation using one or more machine learning models to obtain the first interpretation of the mixed-mode dictation;
      presenting the first interpretation of the mixed-mode dictation to the user in the application on the data processing system;
      receiving a second audio input from the user comprising a corrective command in response to presenting the first interpretation in the application, wherein the second audio input includes a restatement of the mixed-mode dictation with an alternative phrasing;
      analyzing the second audio input to obtain a second interpretation of the restatement of the mixed-mode dictation provided by the user by processing the second audio input using one or more natural language processing models to obtain a second textual representation of the restatement of the mixed-mode dictation and processing the second textual representation using the one or more machine learning models to obtain the second interpretation of the restatement of the mixed-mode dictation;
      presenting the second interpretation to the user in the application on the data processing system;
      receiving an indication from the user that the second interpretation is a correct interpretation of the mixed-mode dictation; and
      responsive to the indication from the user, modifying operating parameters of the one or more machine learning models to interpret subsequent instances of the mixed-mode dictation based on the second interpretation by generating training data for the one or more machine learning models that associates the mixed-mode dictation with the second interpretation and retraining the one or more machine learning models using the training data.

2. The data processing system of claim 1, wherein to present the first interpretation to the user in the application includes instructions configured to cause the processor to perform operations of:
   processing the first interpretation of the mixed-mode dictation in the application by executing the command, rendering the textual content, or both included in the mixed-mode dictation.

3. The data processing system of claim 1, wherein to present the second interpretation to the user in the application includes instructions configured to cause the processor to perform operations of:
   processing the second interpretation of the restatement of the mixed-mode dictation in the application by executing the command, rendering the textual content, or both included in the restatement of the mixed-mode dictation.

4. The data processing system of claim 3, further including instructions configured to cause the processor to perform operations of:
   receiving a third audio input from the user comprising the mixed-mode dictation;
   analyzing the third audio input using the one or more machine learning models based on the second interpretation to obtain a third interpretation of the mixed-mode dictation; and
   processing the third interpretation of the third audio input in the application by executing the command, rendering the textual content, or both included in the mixed-mode dictation.

5. The data processing system of claim 4, further including instructions configured to cause the processor to perform an operation of:
   identifying a term or phrase included in the second textual representation indicative of the second audio input including the corrective command, and
   wherein to analyze the first textual representation using the one or more machine learning models further comprises instructions configured to cause the processor to perform an operation of analyzing the first textual representation and the identified term or phrase to determine whether the first textual representation and the identified term or phrase are indicative of the first audio input including the corrective command.

6. The data processing system of claim 1, wherein to modify the operating parameters of the one or more machine learning models to interpret the subsequent instances of the mixed-mode dictation based on the second interpretation the computer-readable medium includes instructions configured to cause the processor to perform operations of:
   updating one or more operating parameters of the operating parameters of the one or more machine learning models based on a difference between the first interpretation and the second interpretation.

7. The data processing system of claim 1, wherein to modify the operating parameters of the one or more machine learning models to interpret the subsequent instances of the mixed-mode dictation based on the second interpretation the computer-readable medium includes instructions configured to cause the processor to perform operations of:
- generating training data for the one or more machine learning models based on a difference between the first interpretation and the second interpretation.

8. The data processing system of claim 1, further including instructions configured to cause the processor to perform operations of:
- sending one or more commands to the application to undo one or more previous commands responsive to receiving the second audio input comprising the corrective command.

\* \* \* \* \*